United States Patent
Liao

(10) Patent No.: US 7,552,931 B2
(45) Date of Patent: Jun. 30, 2009

(54) GOLF CART COLLAPSIBLE DEVICE

(75) Inventor: Gordon Liao, Yung Kang (TW)

(73) Assignee: Unique Product & Design Co., Ltd., Yung Kang (TW)

( * ) Notice: Subject to any disclaimer, the term of this patent is extended or adjusted under 35 U.S.C. 154(b) by 51 days.

(21) Appl. No.: 11/935,645

(22) Filed: Nov. 6, 2007

(65) Prior Publication Data

US 2009/0115168 A1    May 7, 2009

(51) Int. Cl.
*B62B 1/00* (2006.01)

(52) U.S. Cl. ............... 280/47.34; 280/654; 280/DIG. 6

(58) Field of Classification Search ............ 280/47.34, 280/651, 654, DIG. 6, 646, 652, 38, 40, 659, 280/639, 62, 642
See application file for complete search history.

(56) References Cited

U.S. PATENT DOCUMENTS

| | | | | |
|---|---|---|---|---|
| 4,657,100 A * | 4/1987 | Lewis | ..................... | 180/19.1 |
| 5,582,419 A * | 12/1996 | Lucia et al. | ................... | 280/42 |
| 6,299,195 B1 * | 10/2001 | Chan | .......................... | 280/651 |
| 6,715,785 B2 * | 4/2004 | Shieh | ........................ | 280/651 |
| 7,063,340 B1 * | 6/2006 | Wu | ......................... | 280/47.26 |
| 7,137,644 B2 * | 11/2006 | Kimberley | .................. | 280/651 |

\* cited by examiner

*Primary Examiner*—Christopher P Ellis
*Assistant Examiner*—Bridget Avery
(74) *Attorney, Agent, or Firm*—Alan Kamrath; Kamrath & Associates PA

(57) ABSTRACT

A golf cart collapsible device includes a frame including an upper frame and a lower frame, a foldable articulation mounted on a mediate portion of the lower frame for folding the lower frame, two rear wheel frames mounted between the lower frame and two rear wheels, a collapsible articulation mounted between the lower frame and a front wheel frame for folding a front wheel, and a pull bar mounted between the collapsible articulation and the two rear wheel frames. Thus, the pull bar is connected between the collapsible articulation and the two rear wheel frames, so that when the front wheel is folded, the pull bar is driven to move the two rear wheels simultaneously so as to fold the front wheel and the two rear wheels simultaneously by connection of the pull bar.

6 Claims, 6 Drawing Sheets

GOLF CART COLLAPSIBLE DEVICE

BACKGROUND OF THE INVENTION

1. Field of the Invention

The present invention relates to a collapsible device and, more particularly, to a collapsible device for a golf cart.

2. Description of the Related Art

A conventional golf cart collapsible device in accordance with the prior art shown in FIG. 11 comprises a first foldable articulation 11 mounted between an upper frame 1 and a lower frame 2 for folding the upper frame 1 and adjusting the height (or the angle) of a handlebar 10 of the upper frame 1, a second foldable articulation 12 mounted on a mediate portion of the lower frame 2 for folding the lower frame 2, two rear wheel frames 31 mounted between the lower frame 2 and two rear wheels 3, a third foldable articulation 13 mounted between the lower frame 2 and a front wheel frame 41 for folding a front wheel 4, and two pull bars 32 each mounted between the upper frame 1 and a respective rear wheel frame 31. Thus, the two pull bars 32 are connected between the upper frame 1 and the rear wheel frames 31, so that when the upper frame 1 is folded, the two rear wheels 3 are moved backward to fold the two rear wheels 3 and the upper frame 1 simultaneously.

However, the two pull bars 32 are connected between the upper frame 1 and the rear wheel frames 31, so that when the upper frame 1 is moved to adjusting the height of the handlebar 10, the two rear wheels 3 are also moved to change the whole angle of the golf cart, thereby affecting the stability of the golf cart. In addition, the front wheel 4 and the two rear wheels 3 are folded individually and cannot be folded simultaneously, thereby causing inconvenience to a user when folding the golf cart.

BRIEF SUMMARY OF THE INVENTION

In accordance with one embodiment of the present invention, there is provided a golf cart collapsible device, comprising a frame including an upper frame and a lower frame, a foldable articulation mounted on a mediate portion of the lower frame for folding the lower frame, two rear wheel frames mounted between the lower frame and two rear wheels, a collapsible articulation mounted between the lower frame and a front wheel frame for folding a front wheel, and a pull bar mounted between the collapsible articulation and the two rear wheel frames. The pull bar is connected between the collapsible articulation and the two rear wheel frames, so that when the front wheel is folded, the pull bar is driven to move the two rear wheels simultaneously so as to fold the front wheel and the two rear wheels simultaneously by connection of the pull bar.

In accordance with another embodiment of the present invention, there is provided a golf cart collapsible device, comprising a frame including an upper frame and a lower frame, a foldable articulation mounted on a mediate portion of the lower frame for folding the lower frame, two rear wheel frames mounted between the lower frame and two rear wheels, a collapsible articulation mounted between the lower frame and a front wheel frame for folding a front wheel, and a pull bar mounted between the two rear wheel frames and the front wheel frame. The pull bar is connected between the two rear wheel frames and the front wheel frame, so that when the front wheel is folded, the pull bar is driven to move the two rear wheels simultaneously so as to fold the front wheel and the two rear wheels simultaneously by connection of the pull bar.

The primary objective of the present invention is to provide a golf cart collapsible device, wherein the front wheel and the two rear wheels are folded simultaneously by connection of the pull bar so that the golf cart is folded easily and quickly, thereby facilitating a user folding the golf cart.

Another objective of the present invention is to provide a golf cart collapsible device, wherein the upper frame is not connected with the pull bar, so that when the upper frame is movable to adjust the height of the handlebar of the upper frame, movement of the upper frame will not move the front wheel and the two rear wheels and will not affect the angle of the golf cart such that the golf cart is disposed at a stable and steady state.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
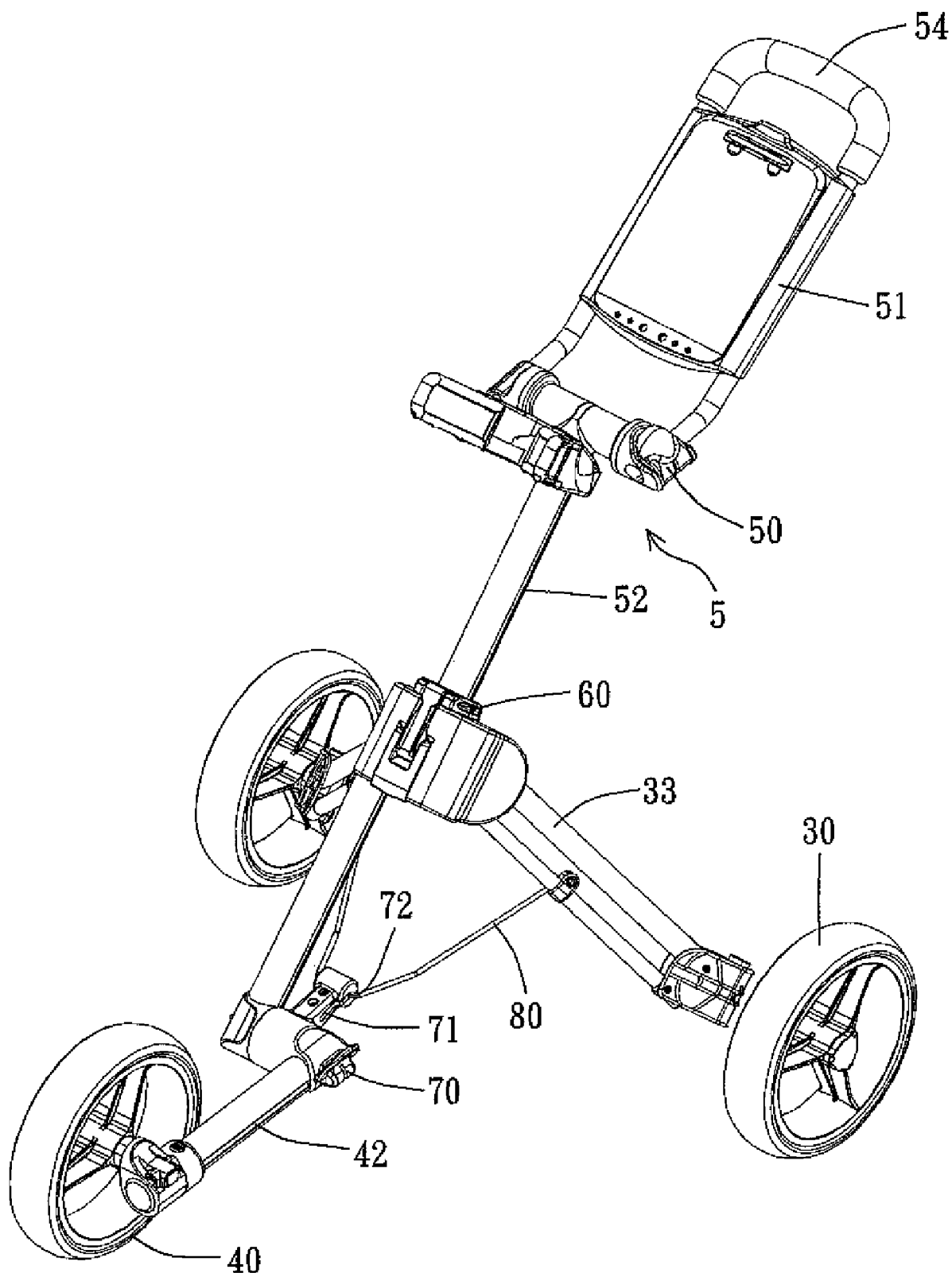
FIG. 1 is a perspective view of a golf cart collapsible device in accordance with the preferred embodiment of the present invention.
Figure 2:
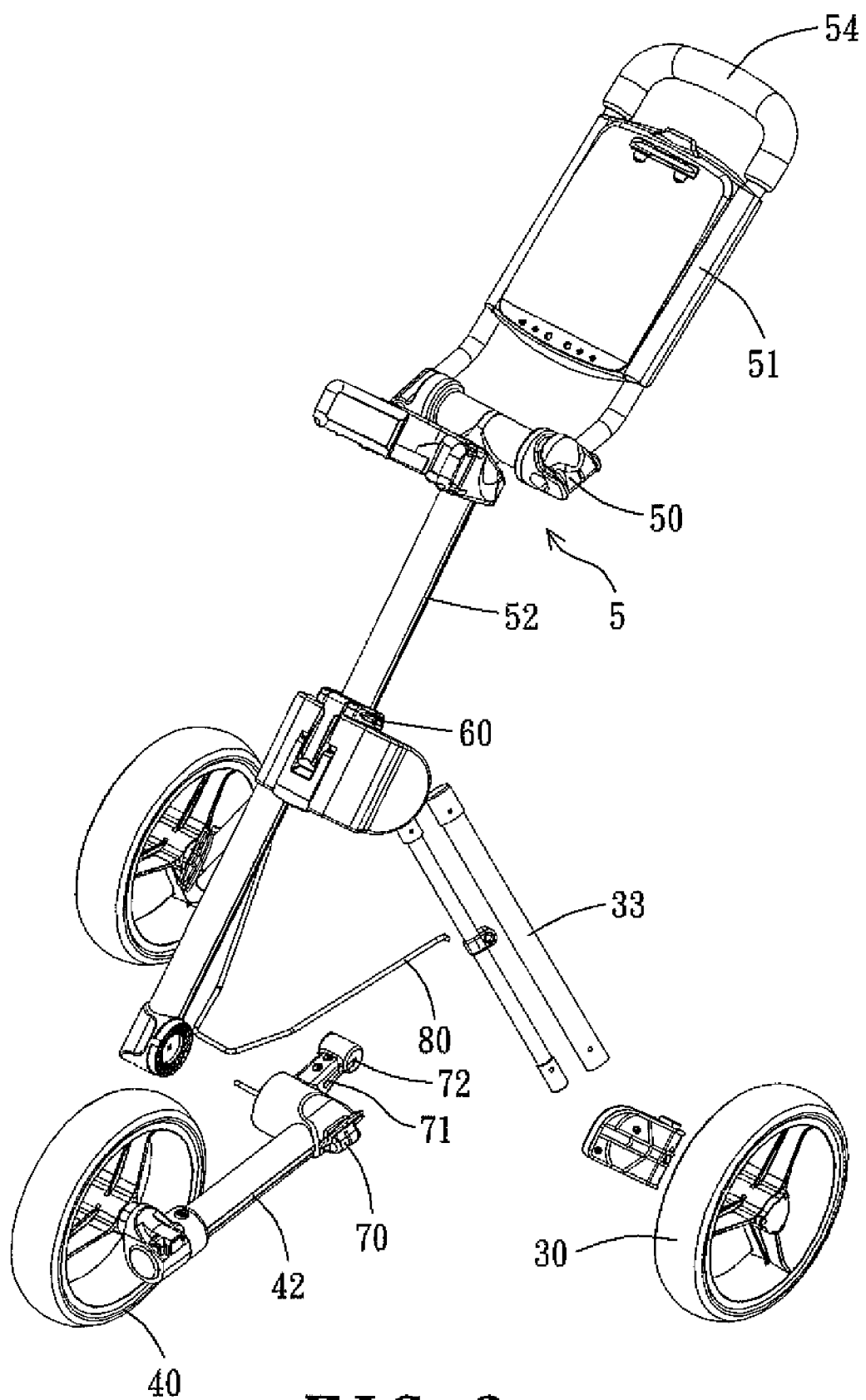
FIG. 2 is a partially exploded perspective view of the golf cart collapsible device as shown in FIG. 1.

Referring to the drawings and initially to FIGS. 1 and 2, a golf cart collapsible device in accordance with the preferred embodiment of the present invention comprises a frame 5 including an upper frame 51 and a lower frame 52, a collapsible articulation 50 (such as a rotation articulation or retractable articulation) mounted between an upper frame 51 and a lower frame 52 for folding the upper frame 51 and adjusting a height of a handlebar 54 of the upper frame 51, a foldable articulation 60 mounted on a mediate portion of the lower frame 52 for folding the lower frame 52, two rear wheel frames 33 mounted between the lower frame 52 and two rear wheels 30, and a collapsible articulation 70 mounted between the lower frame 52 and a front wheel frame 42 for folding a front wheel 40. The above-mentioned structure is conventional and will not be further described in detail.

In the preferred embodiment of the present invention, the golf cart collapsible device further comprises a fixing seat 71 fixed on an outer side of the collapsible articulation 70 and having a slot 72, and a substantially V-shaped pull bar 80 mounted between the collapsible articulation 70 and the two rear wheel frames 33 and having a first end extending through the slot 72 of the fixing seat 71 to connect the pull bar 80 with the collapsible articulation 70 and a second end having two opposite sides connected with the two rear wheel frames 33 respectively.

Figure 3:
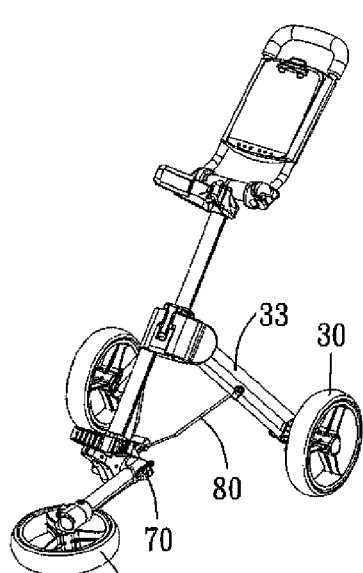
FIGS. 3-8 are perspective view showing a folding process of the golf cart collapsible device as shown in FIG. 1.
Figure 4:
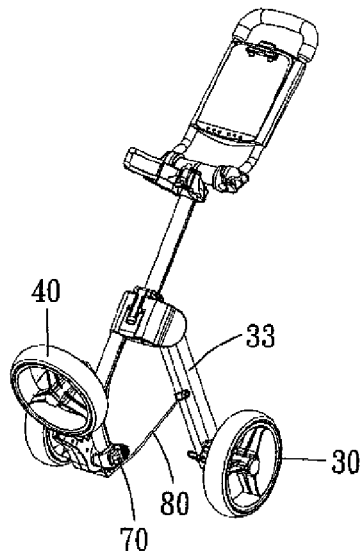

In such a manner, the pull bar 80 is connected between the collapsible articulation 70 and the two rear wheel frames 33, so that when the front wheel 40 is folded, the pull bar 80 is driven to move the two rear wheels 30 simultaneously as shown in FIGS. 3 and 4 so as to retract and fold the two rear wheels 30 simultaneously. Thus, the front wheel 40 and the two rear wheels 30 are folded simultaneously as shown in FIGS. 3-5 by connection of the pull bar 80.

Figure 9:
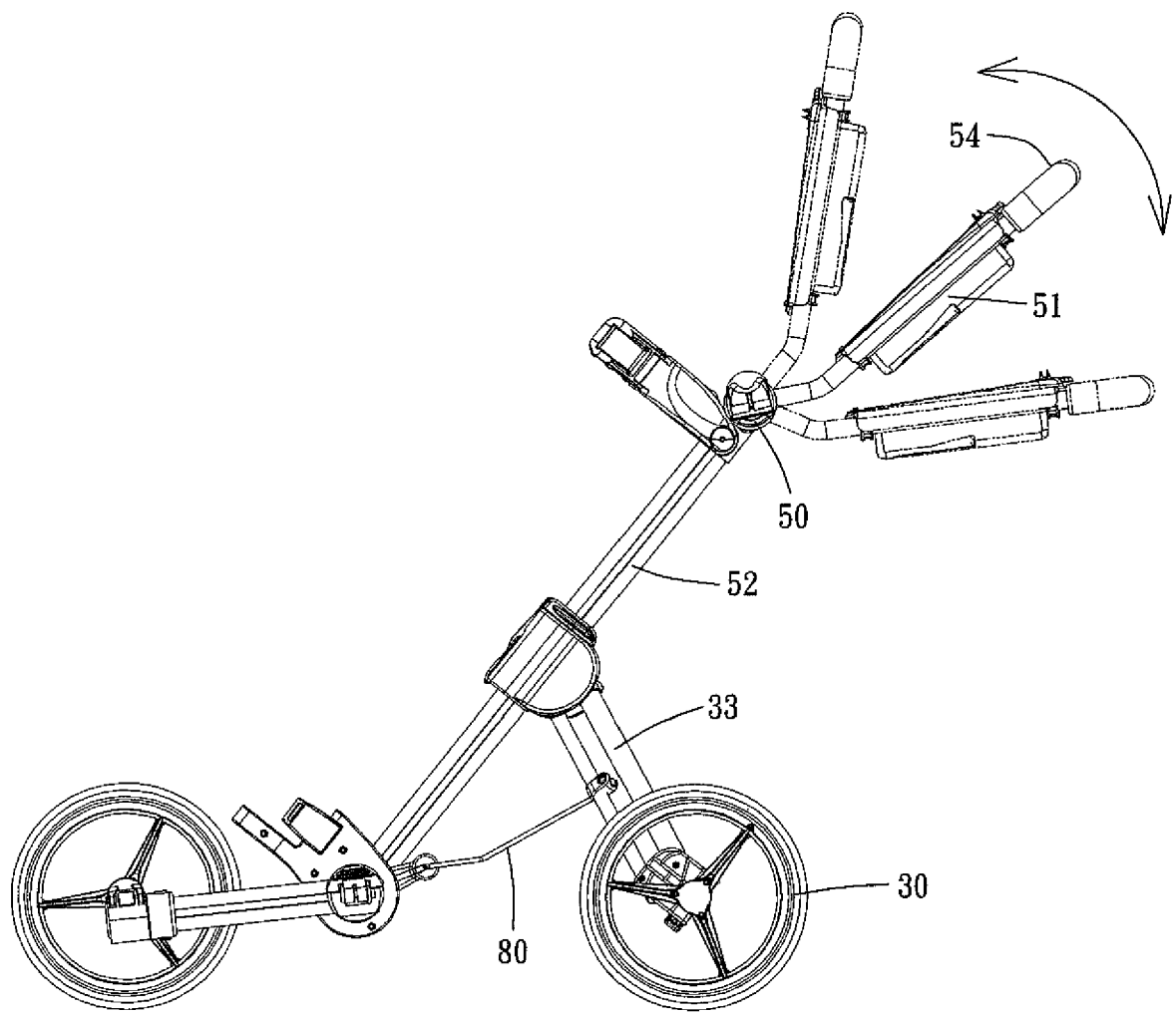
FIG. 9 is a schematic side operational view of the golf cart collapsible device as shown in FIG. 1.

At this time, the upper frame 51 is not connected with the pull bar 80, so that when the upper frame 51 (no matter when the collapsible articulation 50 on the upper frame 51 is a rotation articulation or retractable articulation) is movable to adjust the height of the handlebar 54 of the upper frame 51 as shown in FIG. 9, movement of the upper frame 51 will not move the front wheel 40 and the two rear wheels 30 and will not affect the angle of the golf cart such that the golf cart is disposed at a stable and steady state.

Figure 5:
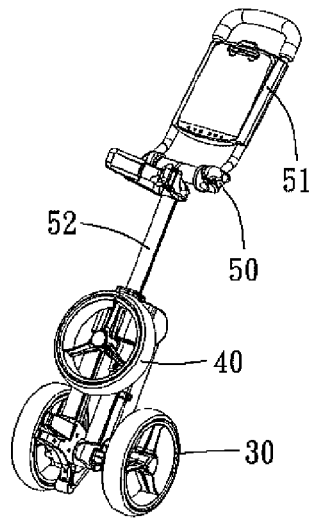
Figure 6:
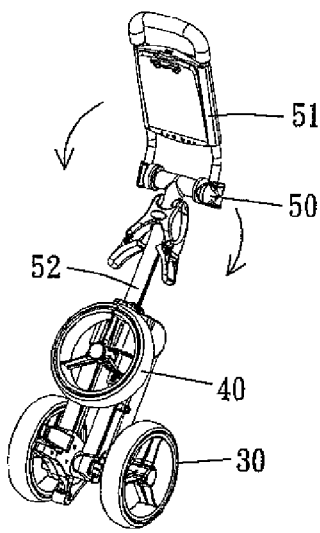
Figure 7:
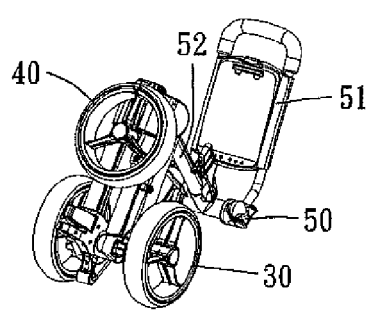
Figure 8:
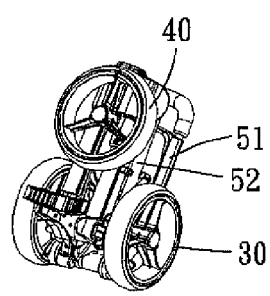

Referring to FIGS. 3-8, the folding procedures of the golf cart collapsible device are shown. In folding of the golf cart, the front wheel 40 is initially disposed at a flat state as shown in FIG. 3. Then, the front wheel 40 and the two rear wheels 30 are folded and retracted inward simultaneously as shown in FIGS. 4 and 5. At this time, the front wheel 40 rests on a side of the lower frame 52 smoothly. Then, the lower frame 52 is folded, and the upper frame 51 is also folded as shown in FIGS. 6 and 7 so as to fold the golf cart as shown in FIG. 8. At this time, the upper frame 51, the lower frame 52 and the front wheel 40 abut each other and are parallel with each other.

Accordingly, the front wheel 40 and the two rear wheels 30 are folded simultaneously by connection of the pull bar 80 so that the golf cart is folded easily and quickly, thereby facilitating a user folding the golf cart. In addition, the upper frame 51 is not connected with the pull bar 80, so that when the upper frame 51 is movable to adjust the height of the handlebar 54 of the upper frame 51 as shown in FIG. 9, movement of the upper frame 51 will not move the front wheel 40 and the two rear wheels 30 and will not affect the angle of the golf cart such that the golf cart is disposed at a stable and steady state.

Figure 10:
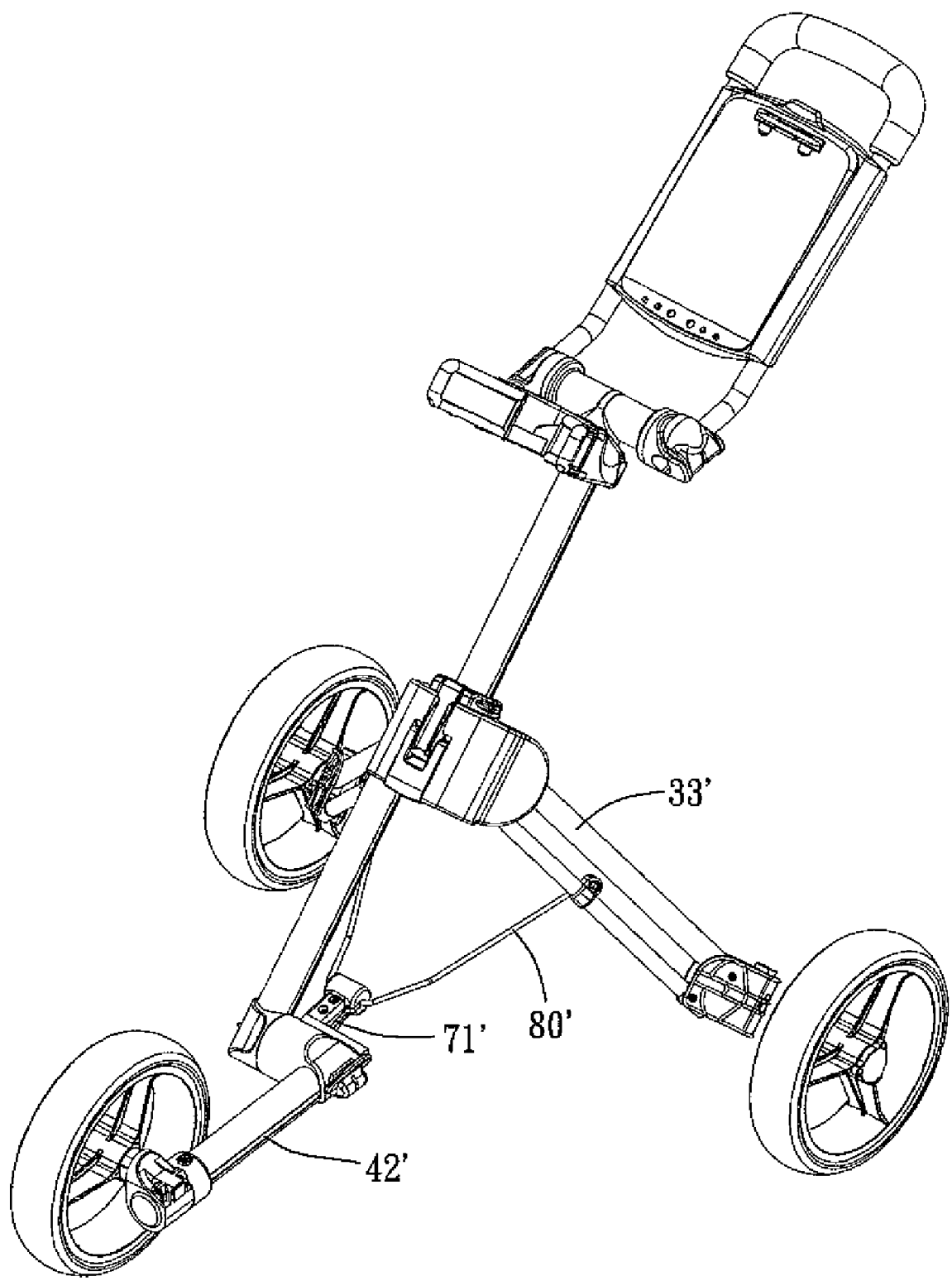
FIG. 10 is a perspective view of a golf cart collapsible device in accordance with another preferred embodiment of the present invention.
Figure 11:
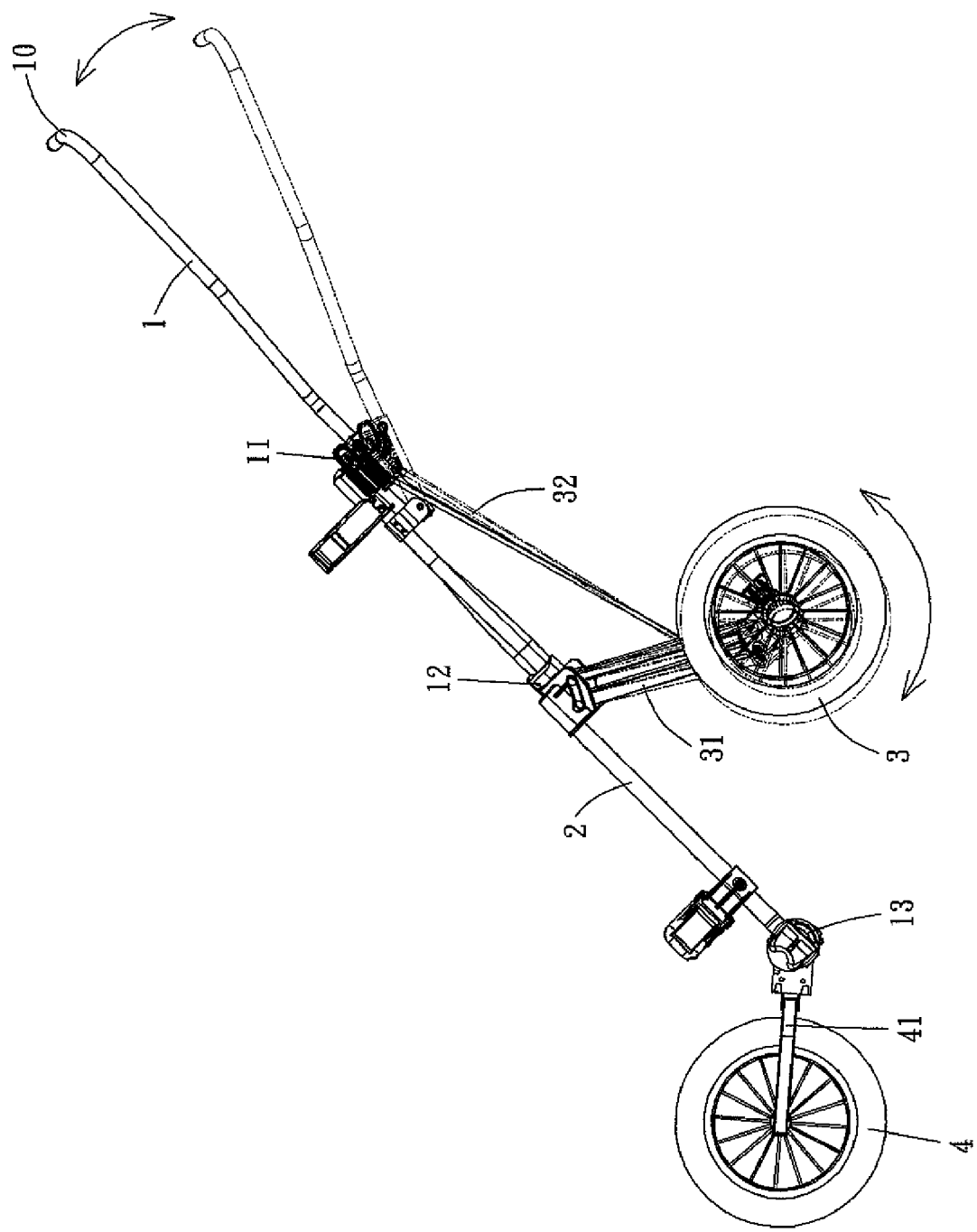
FIG. 11 is a side operational view of a conventional golf cart collapsible device in accordance with the prior art.

Referring to FIG. 10, the fixing seat 71' is directly connected with or fixed on another end of the front wheel frame 42' so that the pull bar 80' is connected or mounted between the two rear wheel frames 33' and the front wheel frame 42'.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A golf cart collapsible device, comprising:
   a frame including an upper frame and a lower frame;
   a foldable articulation mounted on a mediate portion of the lower frame for folding the lower frame;
   two rear wheel frames mounted between the lower frame and two rear wheels;
   a collapsible articulation mounted between the lower frame and a front wheel frame for folding a front wheel;
   a pull bar mounted between the collapsible articulation and the two rear wheel frames;
   wherein the pull bar is connected between the collapsible articulation and the two rear wheel frames, so that when the front wheel is folded, the pull bar is driven to move the two rear wheels simultaneously so as to fold the front wheel and the two rear wheels simultaneously by connection of the pull bar.

2. The golf cart collapsible device in accordance with claim 1, further comprising a fixing seat mounted on an outer side of the collapsible articulation.

3. The golf cart collapsible device in accordance with claim 1, wherein the pull bar is substantially V-shaped.

4. A golf cart collapsible device, comprising:
   a frame including an upper frame and a lower frame;
   a foldable articulation mounted on a mediate portion of the lower frame for folding the lower frame;
   two rear wheel frames mounted between the lower frame and two rear wheels;
   a collapsible articulation mounted between the lower frame and a front wheel frame for folding a front wheel;
   a pull bar mounted between the two rear wheel frames and the front wheel frame;
   wherein the pull bar is connected between the two rear wheel frames and the front wheel frame, so that when the front wheel is folded, the pull bar is driven to move the two rear wheels simultaneously so as to fold the front wheel and the two rear wheels simultaneously by connection of the pull bar.

5. The golf cart collapsible device in accordance with claim 4, wherein the collapsible articulation is mounted between the lower frame and a first end of the front wheel frame, and the golf cart collapsible device further comprises a fixing seat mounted on a second end of the front wheel frame.

6. The golf cart collapsible device in accordance with claim 4, wherein the pull bar is substantially V-shaped.

* * * * *